July 19, 1955     I. B. PRETTYMAN ET AL     2,713,260
APPARATUS FOR TESTING ELASTOMERIC MATERIALS
Filed March 16, 1953     5 Sheets-Sheet 3

INVENTORS
IRVEN B. PRETTYMAN &
FRANK S. GROVER
BY
*W. A. Fraser*
ATTY.

July 19, 1955  I. B. PRETTYMAN ET AL  2,713,260
APPARATUS FOR TESTING ELASTOMERIC MATERIALS
Filed March 16, 1953  5 Sheets-Sheet 4

INVENTORS
IRVEN B. PRETTYMAN &
FRANK S. GROVER
BY W. A. Fraser
ATTY.

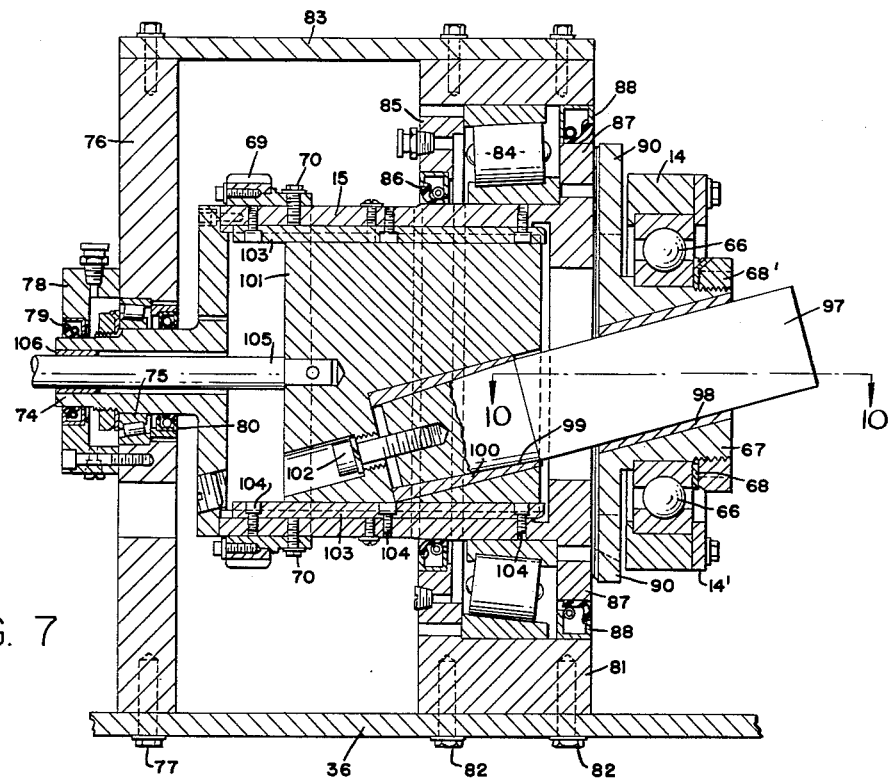

United States Patent Office 2,713,260
Patented July 19, 1955

2,713,260

APPARATUS FOR TESTING ELASTOMERIC MATERIALS

Irven B. Prettyman and Frank S. Grover, Akron, Ohio, assignors to The Firestone Tire & Rubber Company, Akron, Ohio, a corporation of Ohio Application March 16, 1953, Serial No. 342,576

17 Claims. (Cl. 73—101)

The invention relates generally to a device for testing rubber or the like for hysteresis or energy loss under conditions of constant shear stress amplitude and constant strain amplitude, and more particularly to a device which can measure separately the temperature rise produced in the rubber by flexing it either under conditions of constant shear stress or under conditions of constant strain, in amplitudes comparable to those present in the rubber in actual service.

Many rubber products are subjected in actual service to a wide variety of stresses causing varying strains or cyclic deformations which are difficult to analyze. For example, in a pneumatic tire in service the side wall and tread are subjected to a complex combination of forces which generate heat in the tire under conditions of both constant stress amplitude and constant strain amplitude. The thin layers of ply stock in the side wall of the tire carcass deform essentially in cycles of constant strain controlled by the fabric structure which undergoes cycles of constant predetermined amplitude, while the outer regions of the tread deform in cycles of constant maximum compressional stress upon which are superposed constant bending strain cycles. Certain prior testing devices have attempted to simulate this combination of forces in testing a specimen to ultimate failure, but the results have not been satisfactory, mainly because forces acting under conditions of constant shear stress amplitude and constant strain amplitude cannot be separately evaluated in terms of the heat generated in the specimen.

A prior testing device of this type is shown in Patent No. 2,048,314, granted July 21, 1936, to R. W. Allen. In this device, a specimen is compressed under uniform pressures and an orbital movement is applied to one of its surfaces under compression to flex the specimen until the heat generated in the specimen gradually builds up, causing the specimen to become thinner and thinner and ultimately causing failure of the specimen. The results of such a test are of limited value only by comparison with similar tests on other specimens. No separate evaluation of the forces within the specimen under conditions of constant shear stress amplitude and constant strain amplitude is possible, because the stress is proportional to the height of the speciment which is changing constantly as the specimen is flattened, and the strain as measured by the deformation is also changing constantly.

Other forced vibration testing devices, generally termed "flexometers," have been used with limited success. They operate under arbitrary conditions of static and dynamic stress and strain which are chosen to develop heat in the specimen and are usually far different from the actual forces present in the article in service, and the results are correspondingly misleading. Moreover, such devices do not measure temperature build-up separately under conditions of constant shear stress amplitude and constant strain amplitude.

Forced resonance vibrators, having the ability to measure temperature rise under either constant shear stress or constant strain conditions, have been developed in which a mechanical circuit, including a rubber specimen of given dynamic stiffness and a vibrating mass, and a periodic impressed force, is tuned to operate at resonant frequency of the suspended parts by varying the mass. The dynamic modulus of the specimen is calculated from the frequency and the resonance mass, and the hysteresis or energy loss is calculated from the resonance amplitude and the magnitude of the impressed force.

However, all of these forced vibration devices utilize compressional vibrations from which to calculate the values of dynamic modulus and energy loss, and consequently these values vary with the shape of the particular specimen and the static compression under which it was placed. In order to measure such values independent of the shape of the specimen, testing devices known as forced shear vibrators have been developed.

In these forced shear vibrators two cylindrical specimens are clamped under slight static compression with a central vibrating plate between the specimens attached to a laterally extending rod carrying a variable mass and having a vibrator coil at its outer end suspended in the electromagnetic field of an outer loudspeaker field coil. When alternating current is passed through the vibrating coil at resonant frequency, the specimens are electrically vibrated in shear, and the dynamic modulus and energy loss can be calculated from the frequency, resonance mass, specimen dimensions and resonance amplitude. While these devices enable the calculation of energy losses per unit strain amplitude and per unit shear stress amplitude separately, the forces involved are too small to produce temperature rises in the specimens of a magnitude approaching those generated in a tire in actual service.

A principal object of the present invention is to provide a novel device which will produce temperature rises in test specimens approaching in magnitude those generated in a tire in actual service under conditions either of constant shear stress amplitude or of constant strain amplitude.

Another object is to provide a novel testing device in which the forces involved are of sufficient magnitude to enable the study of conditions present at low temperatures.

Another object is to provide a novel testing device which is adapted to measure both the shear stress and strain amplitudes separately at all times during the testing operation.

A further object is to provide a novel testing device in which the strain amplitude may be automatically varied during operation to continuously maintain constant shear stress amplitude in the test specimens.

These and ancillary objects are attained by the parts, combinations, and arrangements comprising the present invention, which may be described in general terms as a shear flexometer in which specimens are vibrated in shear at right angles to their static compression by means of a mechanical crank or eccentric, the throw of which may be fixed or made adjustable while operating. A strain gauge is connected to the specimens and when conditions of constant strain amplitude are desired, the throw on the eccentric is fixed and the strain gauge measures the shear stress amplitude. When constant shear stress amplitude is desired, the throw of the eccentric is automatically adjusted during operating according to variations on the strain gauge to continuously maintain constant stress in the specimens. Thermocouples are connected directly to the specimens to measure the temperature rise during the test.

A preferred embodiment of the invention is shown by way of example in the accompanying drawings and described in detail herein, but it will be understood that changes and modifications in details of construction and operation may be made without departing from the scope of the invention as defined in the appended claims.

Referring to the drawings:

Fig. 7 is an enlarged sectional view on line 7—7, Fig. 1;

Fig. 8 is an enlarged sectional view on line 8—8, Fig. 1;

Fig. 9 is a fragmentary sectional view on line 9—9, Fig. 8; and

Fig. 10 is an enlarged section on line 10—10, Fig. 7.

Figure 1:
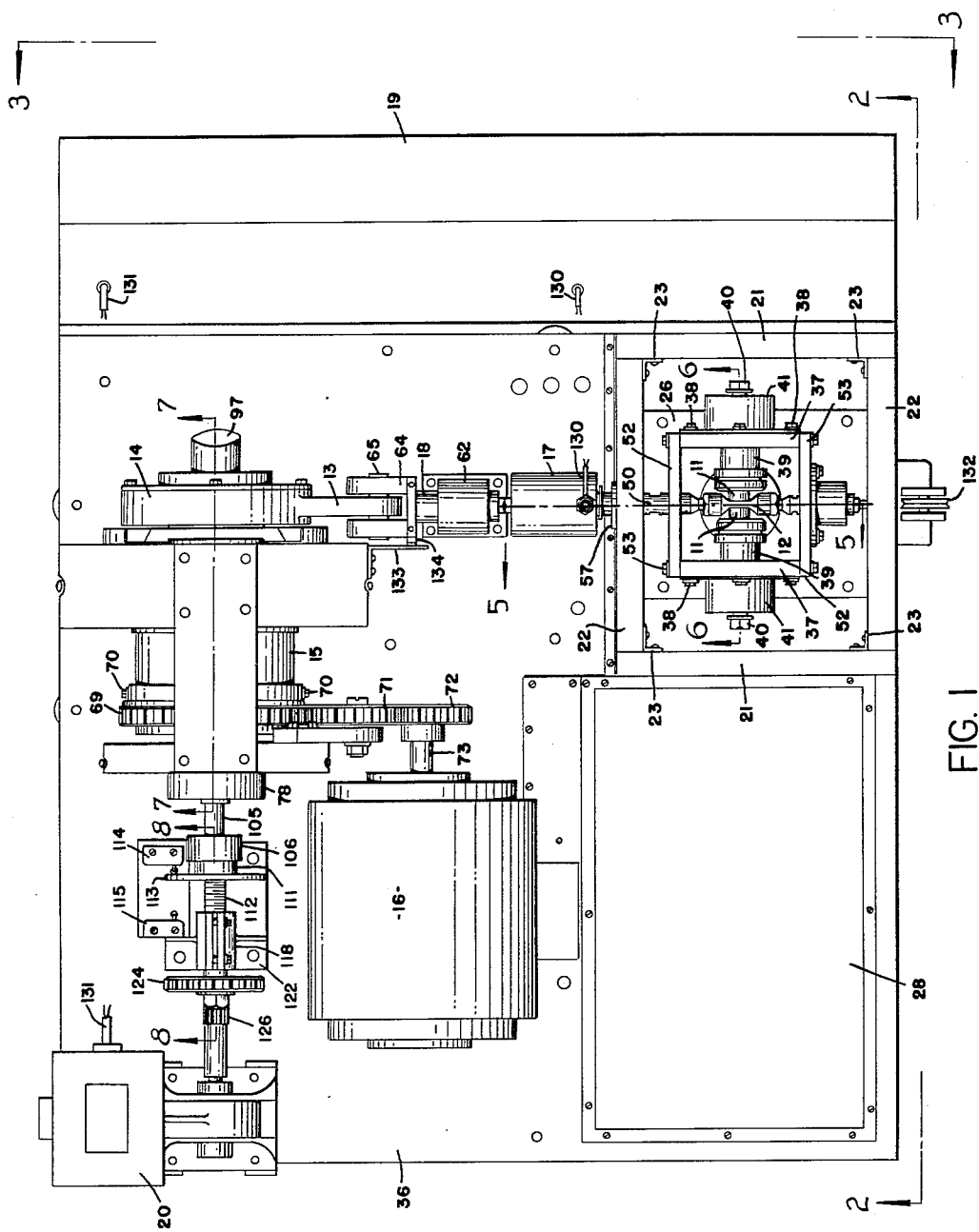
Fig. 1 is a plan view of an apparatus embodying the invention.
Figure 2:
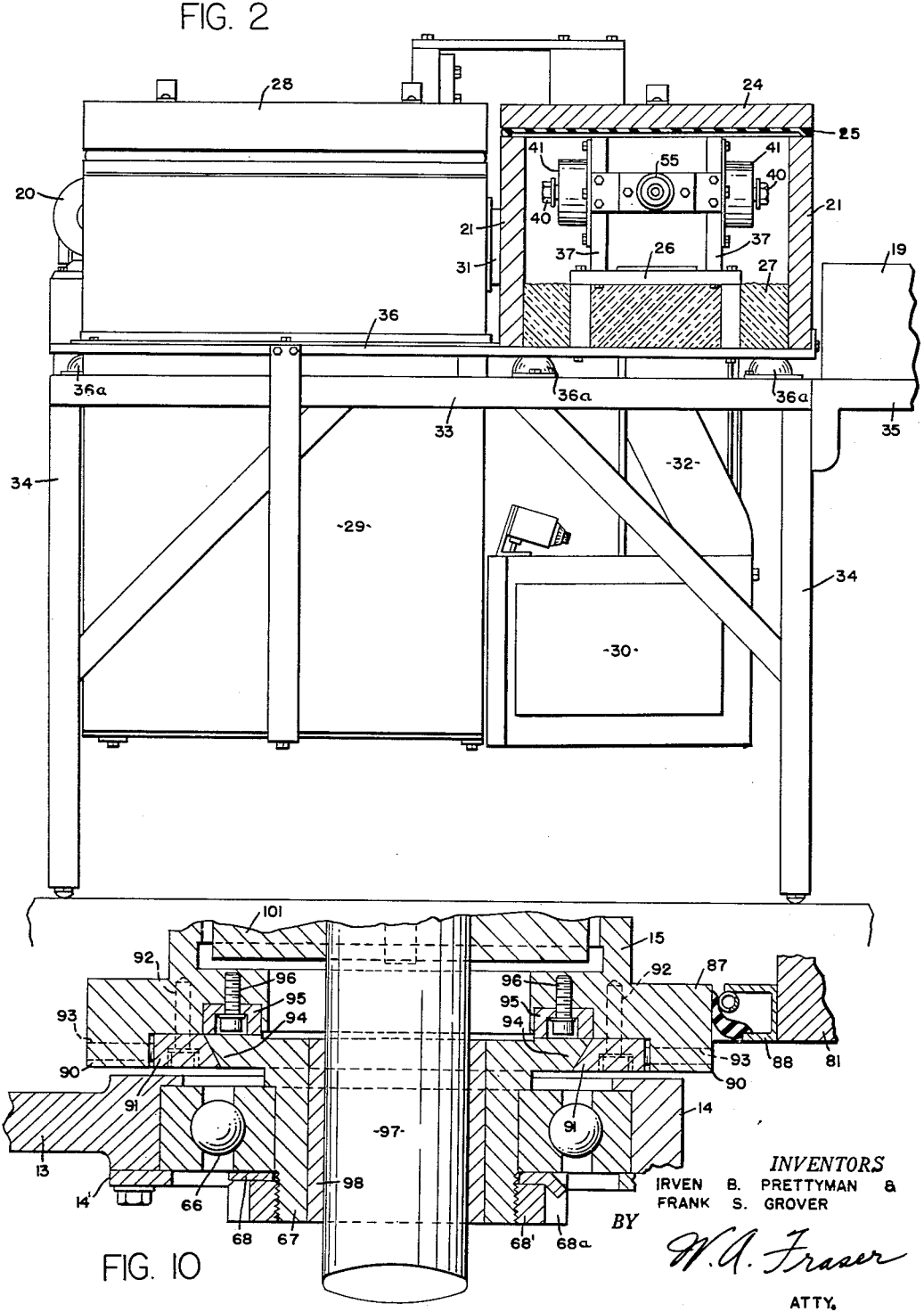
Fig. 2 is an end elevation with the parts broken away and in section, substantially on line 2—2, Fig. 1.
Figure 3:
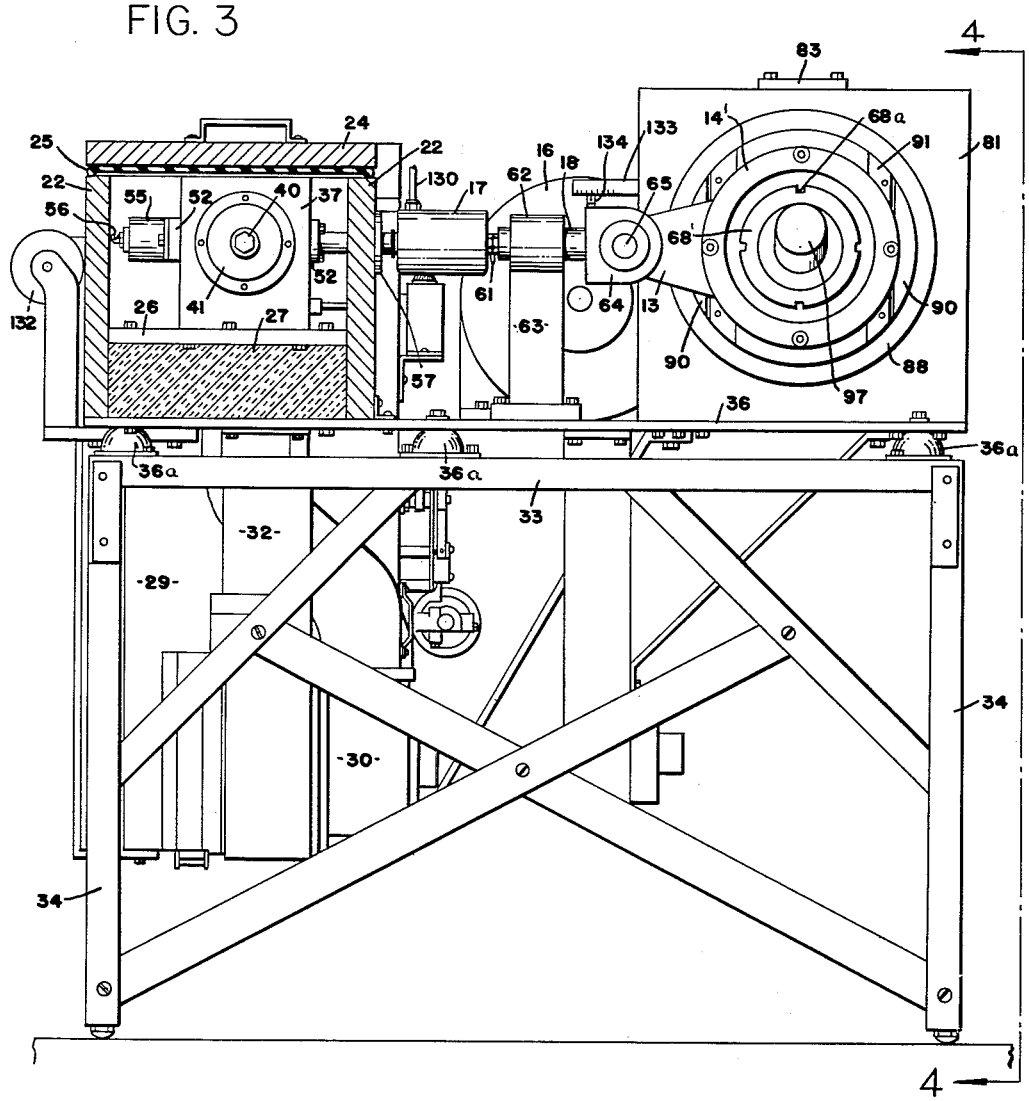
Fig. 3 is a side elevation with parts in section, as on line 3—3, Fig. 1.
Figure 4:
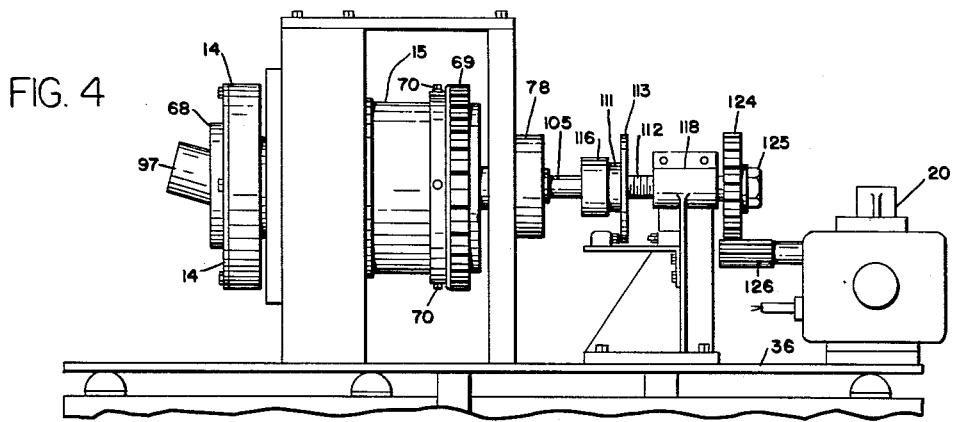
Fig. 4 is an elevation of the end opposite to that of Fig. 2.

Referring to Fig. 1, two specimens are indicated at 11, being held against a central thrust vibrating or reciprocating member 12 under a predetermined amount of static compression applied in the direction of section line 6—6. The thrust member 12 for flexing the specimens in shear is reciprocated at right angles to the compression axis by a crank arm 13 mounted on a bearing retainer ring 14 eccentrically mounted on one end of a rotating drum 15 geared to a driving motor 16. A load cell 17, embodying strain gauges for measuring compression and tension stresses generated in the specimens, is incorporated in the connecting rod 18 between the crank 13 and thrust member 12, and the strain gauges are electrically connected to an electronic pickup and amplifying device of well known construction and indicated generally at 19. The amplifying device 19 is electrically connected to a motor 20 for automatically adjusting the eccentricity of the crank 13 in response to variations in shear stress measured by the load cell and amplified by the device 19, when constant shear stress on the specimens is desired.

The specimens 11 are located in a test chamber formed by rectangular side walls 21 and end walls 22 secured together by suitable brackets 23. A top wall or cover 24 encloses the chamber and a sealing gasket 25 is provided between the cover 24 and the top edges of the walls 21 and 22. The walls 21, 22 and 24 may be constructed of material known as "transitop" or other heat-insulating material. The specimens are supported on a platform 26 within the chamber, and the space below the platform is filled with suitable insulating material such as glass wool or the like indicated at 27.

Figure 5:
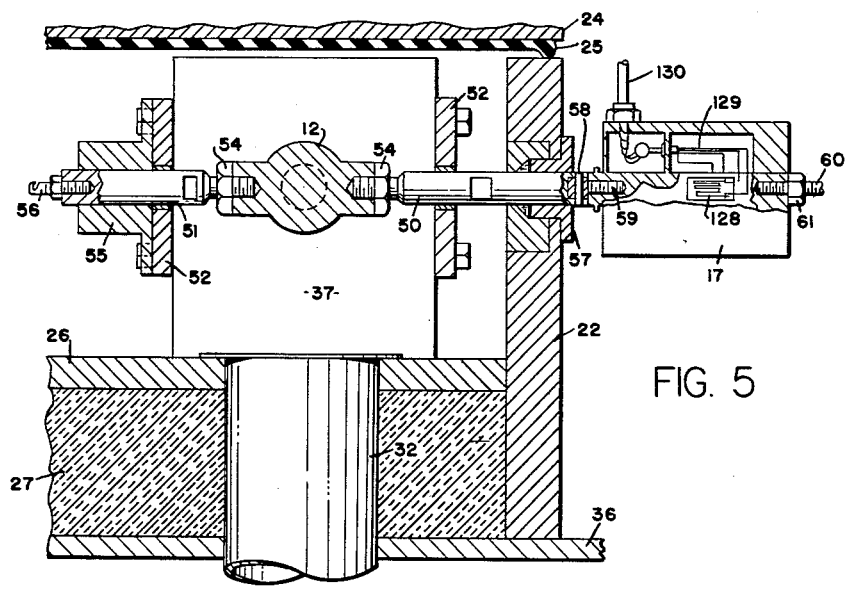
Fig. 5 is an enlarged sectional view on line 5—5, Fig. 1.
Figure 6:
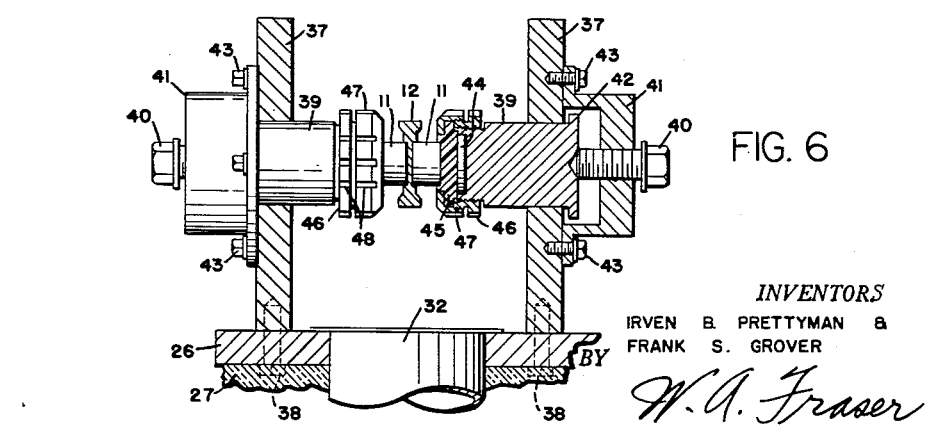
Fig. 6 is an enlarged sectional view on line 6—6, Fig. 1.

Means for circulating the air within the test chamber and controlling its temperature are provided adjacent to the chamber. These means form no part of the present invention and will not be described in detail. Generally speaking, the air circulating means, together with suitable heating and cooling means and thermostatic temperature controls, are embodied in the housings indicated at 28, 29 and 30 which are connected by inlet and exhaust ducts 31 and 32 to the test chamber, the duct 32 extending through the insulation 27 and communicating with the test chamber above the platform, as best shown in Figs. 5 and 6. The housings 28, 29 and 30 are supported on the rectangular framework which supports the rest of the apparatus and includes the top members 33 and corner legs 34. A bracket 35 is mounted on one side of the framework and supports the electronic pickup and amplifying device 19. A platform 36 is yieldingly carried on top of the frame by rubber cushion supports 36a.

The means for mounting the test specimens 11 under static compression against opposite sides of the thrust vibrating member 12 preferably includes two laterally spaced upright plates 37 secured at their lower edges to the platform 26 by screws 38, as shown in Fig. 6. A flanged pressure shaft member 39 is movably mounted in each plate 37 and projects inwardly thereof an amount regulated by a pressure screw 40 threaded through a cap 41 fitting over the flange 42 of the shaft member 39 and secured to the plate 37 by screws 43.

The inner end of each shaft member 39 is recessed to receive a spacer disk 44 which abuts a pressure pad 45 abutting the outer surface of one of the specimens 11. Preferably the disk 44 and pad 45 are of insulating material such as "Bakelite," and are held in position by two locking rings 46 and 47 having spanner wrench slots 48, the locking ring 46 being screwed on shaft member 39 and locking ring 47 being screwed on locking ring 46. Thus any heat generated in the specimens 11 during testing is insulated from the pressure shaft members 39, and the amount of static compression applied to the specimens may be accurately adjusted by the screws 40.

The thrust vibrating member 12 is provided on opposite sides with recesses receiving the inner surfaces of the specimens 11, and the ends of member 12 have threaded sockets into which the threaded ends of connecting rod shafts are screwed. The head and tail connecting rod shafts 50 and 51 are journaled in spaced transverse tie plates 52 secured to the ends of plates 37 by screws 53. The connecting rod shafts are preferably made of insulating material such as "Bakelite," and have reduced end portions screwed into the sockets of thrust member 12, being adjustably secured therein by jamb nuts 54. A bearing block 55 for the tail rod shaft 51 is mounted on rear tie plate 52, and the rod preferably has a calibrating hook 56 screwed in its rear end, for a purpose to be described.

The connecting rod 50 has a bearing in the front tie plate and extends through a packing gland 57 in the front wall 22 to make an airtight seal around the rod. The projecting end of the rod 50 is pivoted at 58 to the head of a stud 59 screwed into one end of the load cell 17 on its axis. At the other end of the axis of the cell a stud 60 is screwed therein and connects the cell to the connecting rod 18, there being a jamb nut 61 on the stud. Thus, the load cell becomes a rigid part of the connecting rod, transmitting the thrust and pull of the crank or throw arm 13 to the thrust member 12. The rod 18 is journaled in a sleeve bearing 62 having a mounting bracket 63 supported on the upper platform 36, and the front end of the rod has a yoke 64 thereon which is pivotally connected to the crank arm 13 by a wrist pin 65.

As shown in Figs. 7 and 10, the bearing retainer ring 14 to which the crank arm 13 is connected is journaled by a ball bearing 66 on the sleeve 67 which is eccentrically mounted with respect to the rotating axis of the drum 15. The inner race of bearing 66 is held in place by a lock washer 68 backed up by a retainer nut 68' screwed on sleeve 67 and having notches 68a for receiving bent tongues on the washer. The outer race is held by a retainer ring 14' detachably mounted on the outer surface of the bearing ring 14. The drum has an exterior ring gear 69 secured thereon by screws 70 and operatively connected by gears 71 and 72 to the shaft 73 of driving motor 16. The drum has a shaft portion or neck 74 at its rear end journaled by a tapered roller bearing 75 in an upright supporting plate 76 mounted on platform 36 by screw studs 77. A lubricant retaining cap 78 for the bearing 75 is mounted on plate 76 and lubricant seals 79 and 80 are mounted on opposite sides of the bearing.

The front end of drum 15 is journaled in an upright plate 81 which rests on platform 36 and is secured thereto by screws 82, the upper part of the plate being connected to plate 76 by a tie plate 83. A large tapered roller bearing 84 journals the front end of the drum in plate 81, there being an annular retaining flange 85 on plate 81 and a lubricant sealing ring 86 at the rear side of the bearing. An annular retaining flange 87 is provided on the drum for the front side of bearing 84 and mates with a sealing ring 88 mounted in the plate 81.

Referring to Fig. 10, the flange 87 of the drum is provided on its front face with diametrically opposite laterally extending guides 90, and beveled ways or guide bars 91 are mounted in said guides by screw studs 92 and laterally supported by thrust studs 93. The sleeve 67 on which the retaining ring 14 is journaled is provided with beveled ways 94 slidable on the ways 91. Preferably, way bars 95 are set in the front face of drum 15 by screw studs 96 and slidably abut the rear surfaces of the ways 94. Accordingly, relative lateral movement of the sleeve 67 along the ways 91 will vary the eccentricity of the sleeve with respect to the axis of the drum, and hence will vary the throw of the crank arm 13.

The mechanism for varying the eccentricity of sleeve 67 to adjust the throw of crank arm 13 preferably includes the inclined displacing shaft 97 journaled in the sleeve 67 and movable axially of the drum 15 by means of a bearing sleeve 98. It will be apparent that movement of shaft 97 to the right as viewed in Fig. 7 will raise the sleeve member 67 on its ways 91, while movement to the left will lower the sleeve member, thus varying the eccentricity of sleeve member 67 and the throw of the crank arm. In the position shown in Fig. 7 the shaft 97 has been moved to its extreme right hand position.

The inner end of shaft 97 is preferably tapered as shown at 99 and received in a tapered steel socket 100 mounted in a shaft block 101 which is preferably bronze. A cap screw 102 secures the end of the shaft 97 in the block. The shaft block 101 is splined in the drum for axial movement thereof by two diametrically opposite keys 103 secured interiorly of the drum by screws 104 and slidable in keyways in the exterior of the block. Thus the block 101 rotates with the drum and the block is axially movable between the ends of the drum.

The block 101 is moved axially of the drum by an axial shaft 105 secured in the rear face of the block and journaled in the hollow shaft portion 74 by means of a bearing sleeve 106. Referring to Fig. 8, the rear end of shaft 105 has a reduced portion on which the inner race 107 of an anti-friction bearing is mounted by a washer 108 held by a nut 109 screwed on the end of the shaft. The outer race 110 of the bearing is secured in a cup 111 on the front end of a push rod screw 112, the cup having a disk 113 thereon for actuating limit switches 114 and 115 to shut off the motor 20. A cap 116 is screwed on the cup 111 and mounts a lubricant seal 117 of usual construction around the shaft 105.

The screw 112 is threaded through a split nut 118 having ears 119 clamped by screws 120. Preferably, the nut 118 has a bronze bushing 121 through which the screw is threaded, and the nut is supported on the top of a bracket 122 secured on the platform 36. The bracket 122 also carries a bracket 123 supporting the limit switches 114 and 115. The rear end of screw 112 has a spur gear 124 mounted thereon by a nut 125, and the gear 124 meshes with a pinion 126 driven by the gear reducer motor 20 supported on platform 36. The pinion 126 is elongated to allow axial movement of the screw 112 within the limits defined by the switches 114 and 115, and the switches are located to correspond with the extreme right and left positions of the block 101 within the drum 15.

Accordingly, rotation of the motor 20 in opposite directions moves the push screw 112 axially back and forth through the nut 118 and slides the block 101 back and forth in the drum to adjust the throw of the crank arm 13 and the stroke of the vibrating thrust member in contact with the specimens 11. Relative rotation of the screw 112 and the shaft 105 which rotates with the drum 15 is accomplished by the relative rotation of the inner and outer races of the bearing 107, 110.

The motor 20 may be automatically controlled to maintain constant shear stress in the test specimens by transmitting variations in shear stress amplitude, as measured by the load cell 17 and amplified by the electronic device 19, to electrically control the motor 20 to vary the stroke of the thrust member automatically in accordance with said variations. As shown in Fig. 5, the load cell 17 is of well known construction and has strain gauges, indicated schematically at 128, bonded to the axial load carrying portion having the connecting studs 59 and 60 in opposite ends. The gauges 128 undergo resistance changes precisely proportional to applied strain, and since the wires 129 of the strain gauges carry an electric current changes in resistance result in changes in output voltage. These changes are transmitted through conductor 130 to the electronic pickup and amplifying device 19, which is electrically connected by conductors 131 to the motor 20 for controlling the operation of the motor in response to the voltage changes, and thus maintaining constant shear stress in the specimens. In order to check the calibration of the load cell, a known weight is suspended by a wire cable attached to the hook 56 and extending around pulley 132.

In order to obtain more accurate measurements of the shear stresses generated in the specimens, it is desirable to provide an additional strain gauge (not shown) of well known construction and positioned parallel to the axis of compression of the specimens. Referring to Fig. 6, such a gauge can be attached to one of the shaft members 39. Such a strain gauge would measure shear forces on the specimens taking the phase angle into account, and would be electrically connected to the electronic pickup and amplifying device. From the readings on the several strain gauges, the dynamic modulus of the specimens can be obtained and the energy loss under conditions of constant strain amplitude and under conditions of constant stress amplitude can be calculated.

In order to operate under conditions of constant strain amplitude, the throw of crank arm 13 is set at a predetermined position and adjusting motor 20 is electrically disconnected by a suitable switch so that the throw is maintained constant. A vernier bar 133 is mounted on the plate 81 adjacent to the yoke 64 of the connecting rod and an indicator 134 is carried on the yoke for cooperating with said vernier bar. The graduations on the vernier bar are calibrated in terms of strain amplitude so that the indicator may be set to produce a desired constant strain amplitude in the specimens.

Thermocouples (not shown) are preferably inserted into the specimens 11 for indicating actual temperature build-up in the specimens as they are flexed in shear by the thrust vibrating member 12. Thus these readings give direct measurements of energy loss in the specimens selectively for changing strain amplitude under conditions of constant shear stress amplitude, and for changing shear stress amplitude under conditions of constant strain amplitude, and by mechanically flexing the specimens in shear the values are of the order of those generated by the actual forces in the specimen, for example, in a tire under load in service.

In the operation of the novel apparatus, when the specimens are being tested under conditions of constant shear stress amplitude maintained by the load cell controlling the motor 20 through the amplifying device 19, the changing strain amplitude is indicated or can be calculated from the graduations on the vernier 133. When the specimens are being tested under conditions of constant strain amplitude by fixing the amount of throw of the crank arm, the changing shear stress amplitude is indicated by a suitable instrument (not shown) which is connected to the strain gauges and may be incorporated in the device 19.

While the apparatus shown and described herein represents the best known mode of carrying out the invention, it is to be understood that this embodiment is by way of example, and that various modifications in the several devices and changes in details of construction may be made

What is claimed is:

1. Apparatus for testing rubber specimens for energy loss due to applied stress, including means for holding a rubber specimen under static compression, adjustable-stroke reciprocating means connected to the specimen for flexing said specimen in shear at right angles to the force of static compression, means for driving the reciprocating means, load cell means connected to said specimen for measuring the shear stress amplitude therein, and means operatively connected with said load cell means for automatically adjusting the stroke of said reciprocating means during operation in accordance with variations in shear stress within said specimen for continuously maintaining constant shear stress amplitude therein.

2. Apparatus for testing rubber specimens for energy loss due to applied stress, including means for holding a rubber specimen under static compression, adjustable-stroke reciprocating means connected to the specimen for flexing said specimen in shear at right angles to the force of static compression, means for driving the reciprocating means, load cell means connected to said specimen for measuring the shear stress amplitude therein, means operatively connected with said load cell means for automatically adjusting the stroke of said reciprocating means during operation in accordance with variations in shear stress within said specimen for continuously maintaining constant shear stress amplitude therein, and said reciprocating means adapted to generate temperature variations in the specimen of the order of those generated in service under load.

3. Apparatus for testing rubber specimens for energy loss due to applied stress, including means for holding a rubber specimen under static compression, adjustable-stroke reciprocating means connected to the specimen for flexing said specimen in shear at right angles to the force of static compression, means for driving the reciprocating means, load cell means connected to said specimen for measuring the shear stress amplitude therein, said reciprocating means being adapted when the stroke is fixed to maintain predetermined constant strain amplitude in the specimen, and means operatively connected with said load cell means for selectively automatically adjusting the stroke of said reciprocating means during operation in accordance with variations in shear stress within said specimen for continuously maintaining constant shear stress amplitude therein.

4. Apparatus for testing rubber specimens for energy loss due to applied stress, including means for holding a rubber specimen under static compression, adjustable-stroke reciprocating means connected to the specimen for flexing said specimen in shear at right angles to the force of static compression, means for driving the reciprocating means, load cell means connected to said specimen for measuring the shear stress amplitude therein, said reciprocating means being adapted when the stroke is fixed to maintain predetermined constant strain amplitude in the specimen, means operatively connected with said load cell means for selectively automatically adjusting the stroke of said reciprocating means during operation in accordance with variations in shear stress within said specimen for continuously maintaining constant shear stress amplitude therein, and said reciprocating means adapted to generate temperature variations in the specimen of the order of those generated in service under load.

5. Apparatus for testing rubber specimens for energy loss due to applied stress, including means for holding a rubber specimen under static compression, reciprocating means connected to the specimen for flexing said specimen in shear substantially perpendicularly to the direction of compressive force, means for adjusting the stroke of said reciprocating means, means for driving said reciprocating means, a motor driving said adjusting means, load cell means connected to said specimen for measuring shear stress amplitude therein, and electronic pickup and amplifying means connected to said load cell means for automatically controlling said motor in response to variations in shear stress to continuously maintain constant shear stress amplitude in the specimen.

6. Apparatus for testing rubber specimens for energy loss due to applied stress, including means for holding a rubber specimen under static compression, connecting rod means connected to the specimen for flexing said specimen in shear substantially perpendicularly to the direction of compressive force, means for adjusting the stroke of said connecting rod means, a motor operatively connected to said adjusting means, means for reciprocating said connecting rod means, said connecting rod means adapted selectively to maintain predetermined constant strain amplitude in said specimen, load cell means connected in said connecting rod means for measuring shear stress amplitude therein, and electronic pickup and amplifying means connected to said load cell means for selectively automatically controlling said motor in response to variations in shear stress to continuously maintain constant shear stress amplitude in the specimen.

7. Apparatus for testing rubber specimens for energy loss due to applied stress, including means for holding a rubber specimen under static compression of predetermined amplitude, a connecting rod operatively connected with the specimen for flexing it in shear substantially perpendicularly to the direction of compressive force, eccentric drive means for reciprocating said connecting rod, electric motor drive means for adjusting the eccentric to change the stroke of the connecting rod, a load cell connected to said connecting rod for measuring shear stress amplitude in the specimen, and electronic pickup and amplifying means electrically connecting said load cell with said motor drive means for automatically controlling said motor in response to variations in shear stress to continuously maintain constant shear stress amplitude in the specimen.

8. Apparatus for testing rubber specimens for energy loss due to applied stress, including means for holding a rubber specimen under static compression of predetermined amplitude, a connecting rod operatively connected with the specimen for flexing it in shear substantially perpendicularly to the direction of compressive force, eccentric drive means for reciprocating said connecting rod, electric motor drive means for adjusting the eccentric to change the stroke of the connecting rod, a load cell connected to said connecting rod for measuring shear stress amplitude in the specimen, electronic pickup and amplifying means electrically connecting said load cell with said motor drive means for automatically controlling said motor in response to variations in shear stress to continuously maintain constant shear stress amplitude in the specimen, and means indicating the strain amplitude in the specimen in terms of the throw of the connecting rod.

9. Apparatus for testing rubber specimens for energy loss due to applied stress, including means for holding two rubber specimens under static compression of predetermined amplitude, a thrust plate abutting and separating the specimens, a connecting rod, a load cell connecting one end of said rod to said thrust plate substantially perpendicularly to the direction of compressive force for measuring shear stress amplitude in said specimens, eccentric drive means connected to the other end of the rod for reciprocating the rod and flexing the specimens in shear, and means operatively connected with said load cell for automatically adjusting said eccentric drive means to vary the stroke of said rod in accordance with variations in shear stress within the specimens for continuously maintaining constant shear stress amplitude therein.

10. Apparatus for testing rubber specimens for energy loss due to applied stress, including means for holding two rubber specimens under static compression of predetermined amplitude, a plate abutting and separating the specimens, a connecting rod, a load cell connecting one end of said rod to said plate substantially perpendicularly to the direction of compressive force for measuring shear stress amplitude in said specimens, eccentric drive means connected to the other end of the rod for reciprocating the rod and flexing the specimens in shear, electric motor drive means for adjusting said eccentric drive means to change the stroke of the connecting rod, and electronic pickup and amplifying means electrically connecting said load cell with said motor drive means for automatically controlling said motor in response to variations in shear stress within the specimens for continuously maintaining constant shear stress amplitude in the specimens.

11. Apparatus for testing rubber specimens for energy loss due to applied stress, including means for holding a specimen under static compression, connecting rod means connected to the specimen and operating at right angles to the compression forces for flexing the specimen in shear, a laterally adjustable eccentric connected to said connecting rod means, a motor for rotating said eccentric to reciprocate said connecting rod means, an inclined shaft adjustably journaled in said eccentric, means for moving the inclined shaft axially of the eccentric to vary its eccentricity, and means controlling the shaft moving means in accordance with variations in shear stress in the specimen.

12. Apparatus for testing rubber specimens for energy loss due to applied stress, including means for holding a specimen under static compression, connecting rod means connected to the specimen and operating at right angles to the compression forces for flexing the specimen in shear, a laterally adjustable eccentric connected to said connecting rod means, a motor for rotating said eccentric to reciprocate said connecting rod means, an inclined shaft adjustably journaled in said eccentric, a motor for moving the inclined shaft axially of the eccentric to vary its eccentricity, and means automatically controlling said latter motor in response to variations in shear stress in the specimen to maintain constant shear stress amplitude in the specimen.

13. Apparatus for testing rubber specimens for energy loss due to applied stress, including means for holding a specimen under static compression, connecting rod means connected to the specimen and operating at right angles to the compression forces for flexing the specimen in shear, a laterally adjustable eccentric connected to said connecting rod means, a motor for rotating said eccentric to reciprocate said connecting rod means, an inclined shaft adjustably journaled in said eccentric, a motor for moving the inclined shaft axially of the eccentric to vary its eccentricity, a load cell connected to the specimen for measuring variations in shear stress therein, and means operatively connecting said load cell to said latter motor to automatically control the motor for maintaining constant shear stress amplitude in the specimen.

14. Apparatus for testing rubber specimens for energy loss due to applied stress, including means for holding a specimen under static compression, connecting rod means connected to the specimen and operating at right angles to the compression forces for flexing the specimen in shear, a laterally adjustable eccentric connected to said connecting rod means, a motor for rotating said eccentric to reciprocate said connecting rod means, an inclined shaft adjustably journaled in said eccentric, a motor for moving the inclined shaft axially of the eccentric to vary its eccentricity, a load cell connected to the specimen for measuring variations in shear stress therein, and an electronic pickup and amplifying device connecting said load cell to said latter motor for maintaining constant shear stress amplitude in the specimen.

15. Apparatus for testing rubber specimens for energy loss due to applied stress, including means for holding a specimen under static compression, connecting rod means connected to the specimen and operating at right angles to the compression forces for flexing the specimen in shear, a rotatable drum, an eccentric laterally adjustable on said drum and connected to said connecting rod means, a motor for rotating the drum to reciprocate said connecting rod means, an inclined shaft journaled in the eccentric and movable axially of the drum, means for moving said shaft to adjust the eccentric, and means controlling the shaft moving means in accordance with variations in shear stress in the specimen.

16. Apparatus for testing rubber specimens for energy loss due to applied stress, including means for holding a specimen under static compression, connecting rod means connected to the specimen and operating at right angles to the compression forces for flexing the specimen in shear, a rotatable drum, an eccentric laterally adjustable on said drum and connected to said connecting rod means, a motor for rotating the drum to reciprocate said connecting rod means, an inclined shaft journaled in the eccentric and movable axially of the drum, motor driven means for moving said shaft axially of the eccentric to adjust its eccentricity, a load cell connected to the specimen for measuring variations in shear stress therein, and means connected to said load cell for operating said motor driven means in response to variations in stress to maintain constant shear stress amplitude in the specimen.

17. Apparatus for testing rubber specimens for energy loss due to applied stress, including means for holding a specimen under static compression, connecting rod means connected to the specimen and operating at right angles to the compression forces for flexing the specimen in shear, a rotatable drum, an eccentric laterally adjustable on said drum and connected to said connecting rod means, a motor for rotating the drum to reciprocate said connecting rod means, an inclined shaft journaled in the eccentric and movable axially of the drum, motor driven means for moving said shaft axially of the eccentric to adjust its eccentricity, a load cell connected to the specimen for measuring variations in shear stress therein, and electronic pickup and amplifying means connecting said load cell to said motor driven means for automatically adjusting the eccentric to maintain constant shear stress amplitude in the specimen.

References Cited in the file of this patent

UNITED STATES PATENTS

| | | |
|---|---|---|
| 2,259,565 | Hutcheson | Oct. 21, 1941 |
| 2,296,466 | Dames et al. | Sept. 22, 1942 |
| 2,386,472 | Kaemmerling | Oct. 9, 1945 |
| 2,514,202 | Prettyman et al. | July 4, 1950 |

FOREIGN PATENTS

| | | |
|---|---|---|
| 840,713 | France | Jan. 23, 1939 |